Patented Feb. 20, 1934

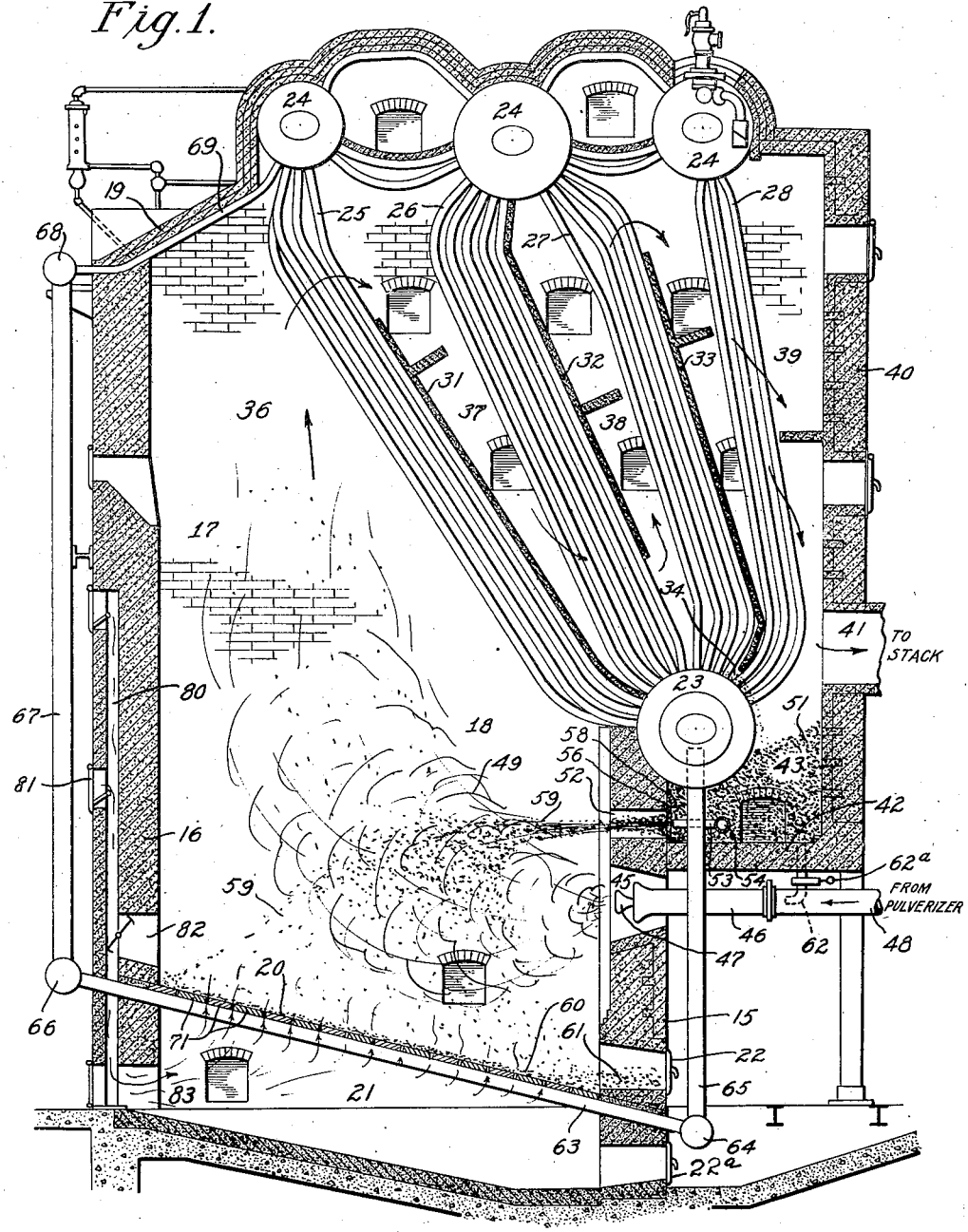

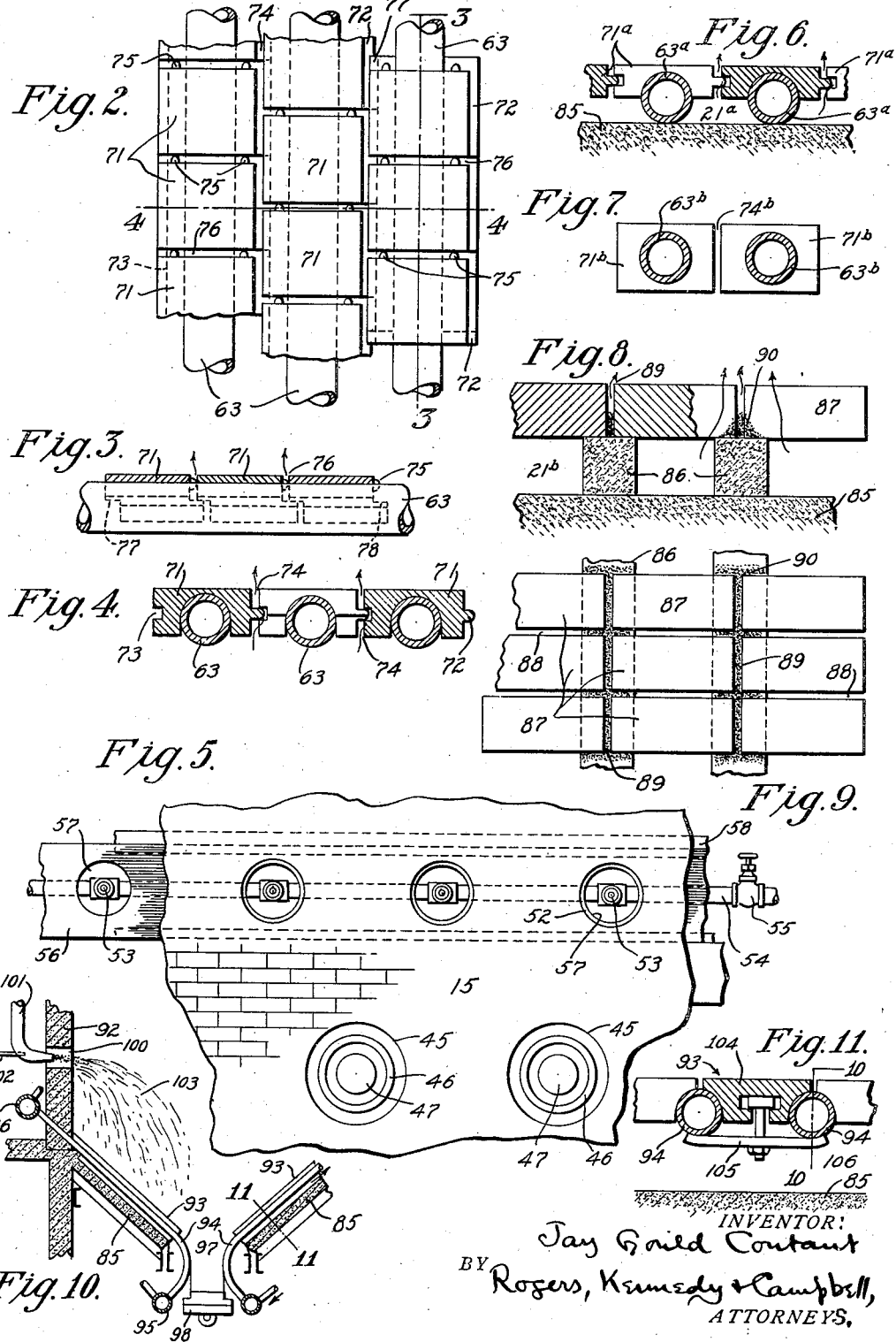
Feb. 20, 1934.   J. G. COUTANT   1,947,460
PULVERIZED FUEL FURNACE AND METHOD OF COMBUSTION
Filed Jan. 31, 1927   2 Sheets-Sheet 2
INVENTOR:
Jay Gould Coutant
BY Rogers, Kennedy & Campbell,
ATTORNEYS.

1,947,460

UNITED STATES PATENT OFFICE 1,947,460

PULVERIZED FUEL FURNACE AND METHOD OF COMBUSTION

Jay Gould Coutant, New York, N. Y.

Application January 31, 1927. Serial No. 164,824

11 Claims. (Cl. 110—28)

This invention is a novel pulverized fuel furnace and method of combustion, and is applicable to various types of furnace, but is more especially useful in boiler furnaces such as employed in large power houses or central stations, wherein pulverized coal in suspension in air is supplied to the furnace, either directly from a pulverizer or from storage, and where the highest capacity and heat efficiency are important.

One object of this invention is, by collecting fly ash or dust from the flues etc. and returning it into the combustion atmosphere, to burn out any otherwise waste combustible therein, sometimes as high as 10% or even more. While in some cases of important value, the recovery of fly ash for further combustion purposes is known in grate furnaces, with pulverized fuel combustion the return of fly ash into the combustion atmosphere gives certain special actions with advantages in themselves important, as will next be described, in which aspect the mere avoidance of combustible losses is incidental.

Another object is to improve the usual process of combustion of pulverized fuel or coal injected and burned in suspension in air, namely by methodically and substantially increasing the amount or density of incandescent suspended non-combustible mineral or ash present throughout the combustion chamber, as by injecting fly ash into the atmosphere. I have discovered that the presence in the combustion atmosphere of the increased supply of floating particles of incandescent mineral materially improves the combustion process, both expediting and rendering more thorough the union of oxygen and carbon. I purposely supply, from any source, and distribute in the combustion zone fly ash or the like, mainly or substantially non-combustible, which absorbs heat as it floats contiguous to or mixed with the injected fuel, and thus maintains an incandescent structure suspended in the combustion zone, which acts in a catalytic manner, as through surface contact, accelerating combustion of the injected main or pulverized fuel supply.

A further object and advantage, connected with the same action, is the greatly improved utilization of combustion heat in connection with a boiler or similar furnace, this being obtained by the increased incandescent glow and radiation, adding greatly to the proportion of heat transferred by radiation to the boiler, and reducing the need of convection transfer and minimizing the heat loss by way of the flues and stack. Practically the entire new fuel supply and the injected mineral are kept at an incandescent glow so that a maximum of heat is converted to and utilized in the radiant form before convection commences. The combustion may be described as "flameless" in the same sense that a gas "mantel" provides flameless combustion as compared with an ordinary gas burner, at the same time yielding more intense radiant heat due to the incandescent non-combustible mineral structure.

A further object is to improve the furnace by combining with the features mentioned a cooled bottom or floor to receive the heavier fuel particles and much of the fly ash settling in the combustion chamber, and to delay their progress to the final exit, so that they may be thoroughly burned out, preferably in the presence of additional air. Other objects and advantages will hereinafter appear in connection with the description of illustrative embodiment of the invention.

In the accompanying drawings Fig. 1 is a general side elevation of the interior of a boiler furnace embodying the present invention, the furnace walls and baffles shown in section.

Fig. 2 is a top plan view of the floor or bottom of the combustion chamber shown in Fig. 1.

Fig. 3 is a longitudinal section taken on the line 3—3 of Fig. 2.

Fig. 4 is a transverse section taken on the line 4—4 of Fig. 2.

Fig. 5 is an interior elevation view looking toward the front of the furnace, that is toward the right in Fig. 1, showing the front wall and the arrangement of admission means for the fuel and ash.

Figs. 6 and 7 are transverse sections, corresponding with Fig. 4, but showing two different modifications of the floor structure, also available for the arch.

Fig. 8 is a partial transverse section and Fig. 9 a top plan view of a modification illustrating an air cooled refractory floor or bottom.

Fig. 10 is a transverse section on the line 10—10 of Fig. 11 showing an embodiment of the invention in a different type of furnace.

Fig. 11 is a section on the line 11—11 of Fig. 10.

The illustrated furnace is shown as having a front wall 15, a rear wall 16 and side walls 17 enclosing the combustion chamber 18. The chamber is also closed at the upper rear portion by an arch 19 and below the chamber is a cooled bottom or floor 20 beneath which and above the concrete foundation is an air box or space 21 through which preheated air may be supplied through the floor as will be described. The floor is inclined downwardly toward the front and at this point the front wall is provided with an ash opening closed by a door 22 by which ashes and other matters may be removed by hand, although the discharge and removal of ash could likewise be effected mechanically or otherwise. Ashes sifting through the floor 20 into the space 21 may similarly be removed through a door 22ª by hand or otherwise.

The furnace and combustion chamber may be of practically any known type or design and the same is true of the boiler and its relation to the combustion chamber. A boiler of the Sterling type is illustratively shown, this comprising a lower or water drum 23 and a plurality of upper or steam drums 24 together with a first bank of boiler tubes 25 extending from the lower to an upper drum and subsequent banks of boiler tubes 26, 27 and 28. Between the first and second banks of boiler tubes is shown a baffle or wall 31 over which the gaseous products of combustion must travel. Between the second and third banks of tubes is a baffle wall 32 below which the products travel and between the third and fourth banks of tubes is a third baffle wall 33 above which the bulk of the products of combustion travel, although, for reasons to be described, I have provided a small gap or aperture 34 between the lower edge of the baffle 33 and the drum 23 through which accumulating dust and ashes may pass by short cut to the ash chamber to be described. With this arrangement of boiler tubes and baffles the boiler may be said to comprise a plurality of passes; the first boiler pass 36 consisting of the space or passage between the rear wall 16 and the baffle 31, the second boiler pass 37 being the space between the baffles 31 and 32, the third pass 38 being the space between the baffles 32 and 33 and the fourth pass 39 being the space between the third baffle 33 and the boiler front wall or extension 40 of the furnace structure. The gaseous products of combustion therefore travel upwardly through the first pass 36, downwardly through the second pass, upwardly through the third pass, except for a small portion of the products which travel directly through the aperture 34, and downwardly through the final pass 39; the products thence passing through the exit 41 to the stack or preliminarily to an economizer or dust collector or other auxiliary apparatus. The lower end of the boiler wall 40 is shown connected by a horizontal wall 42 with the main front wall 15 so as to enclose an ash chamber 43 of ample proportions, this chamber receiving a large portion of the fly ash, diverted from the downward stream in the fourth boiler pass, and received through the opening 34 at the lower end of the third baffle 33. The space 43 therefore constitutes an ash pocket, receptacle, or space, adapted to receive the fly ash for the purposes of the present invention, and this chamber may be taken as illustrative of the principles involved, which may be extended also to the fly ash received in dust collectors or in the flues, stack or elsewhere.

Pulverized fuel may be supplied to the furnace by injection or otherwise. Illustratively the front wall 15 is shown as formed with a fuel entrance or aperture 45 and into this aperture extends a burner 46 which may be any one of many well known types of burner, preferably a burner containing means for giving a whirling motion to the fuel suspended in air driven into the furnace, so as to produce a short flame and immediate combustion as distinguished from other types of flame. The burner may be supplied with pulverized coal in any desired manner, for example direct from a pulverizing machine through a pipe 48. The burner 46 is shown as having a spreader 47 at its delivery end to accentuate the spreading action of the gases, producing a flame indicated roughly at 49. The flame is not forcible but is intensely hot, and beyond the flame body the gases travel upwardly toward the boiler and thence through the respective boiler passes as already described. The air of combustion is largely or wholly supplied in or adjacent to the burner. It will be observed that the burner is spaced slightly from the walls of the fuel entrance 45, so that supplemental air is drawn in by induction to take part in the combustion. Supplemental air may be introduced at the opposite or rear wall or at other points in the furnace, for example through the bottom or floor to be described.

According to this invention the fly ash recovered from the outgoing gases is to be reintroduced into the combustion chamber. This may be done in various ways, but in my preferred form the fly ash is introduced at a point adjacent to or slightly higher than the flame 49 and in a manner to be well distributed or spread across the furnace and to sprinkle or rain downwardly through the hot gases, taking part in the combustion reactions, and eventually being disposed of, partly by being carried out with the combustion gases and partly by precipitating upon the floor or bottom and being removed through the ash door, pit or other ash removal means. For purposes of illustration the ash chamber 43 is shown as partly filled up with fly ash 51. The front wall 15 of the combustion chamber is formed with a series of through apertures 52 constituting an ash entrance into the combustion chamber. While various modes may be employed for driving the fine loose ash into the chamber there is shown, as an illustrative method, a steam pipe 53 in each of the ash entrance apertures 52, so that by driving a fine jet of steam through the entrance, a current is induced and draws the fine ash from the chamber 43 and throws it forcibly toward the middle of the combustion chamber. The several steam nozzles 53 are shown connected to a common steam pipe or header 54 which extends transversely through the ash chamber and may be provided with a controlling valve 55 outside the furnace so that the jets can be thrown out of operation when desired. The ash recirculating system hereof may be desired to be thrown out of action at certain times and for this purpose there is shown a sliding door or damper 56 in the nature of a metal plate formed with apertures 57 corresponding with the ash entrance apertures 52. Fig. 5 shows the apertures 52 and 57 in alinement so that the system is in condition for recirculation of ash. The damper or slide 56, guided in metallic guides or strips 58 may extend to an external point so that by sliding it lengthwise the several ash entrance openings may be closed.

When the ash recovery system is in operation the fly ashes may be thrown into and across the combustion chamber at the respective positions of the entrances 52, in a manner to form a wide distribution or rain of ash, indicated generally at 59. Some particles may pass upwardly with the products of combustion, as indicated, whereas the bulk of the recirculated ash may descend and precipitate toward the floor, forming a thin layer 60. The arrangement is preferably such that the ashes precipitating on the floor have a gradual trend or movement toward the ash door 22, where the ashes will accumulate as indicated at 61 unless and until removed by hand or otherwise. The preferred details of the floor will be next described.

The floor or bottom of the combustion chamber of this invention is preferably cooled in a suitable manner. For this purpose a system of water tubes 63 may be provided, forming part of the floor. These tubes are preferably inclined, for example their front ends may be lower than their rear ends. A front header 64 is shown connected by a pipe 65 with the lower or water drum of the boiler, so that the floor tubes are in direct circulation with the boiler, and receive water from the lower drum through the downtake 65. The upper or rear ends of the floor tubes are similarly interconnected by a rear header 66 from which the ascending hot water or steam passes by a connecting pipe or uptake 67 to a top rear header 68 from which a series or system of short boiler tubes 69 are shown extended, along the under side of the arch 19, and directly exposed to the flames of combustion, to the rearmost of the upper boiler drums 24. The arch 19 is preferably constructed, as shown in Fig. 6, with high conducting or metal elements surrounding and backing the circulation tubes 69, so as to increase the conduction of heat to the tubes and thus appreciably improve the evaporation and performance of the boiler. This water cooled arch is made the subject of claim in my copending application Serial No. 342,039, filed February 23, 1929.

Referring next to the floor construction this is preferably a cooled floor, as stated, for example water cooled, and is also preferably constructed with slits, gaps or other apertures so as to permit the upward percolation of air from the air box 21 through the floor and through the thin layer of fine ash overlying the floor, thus supplying the necessary air for the final and complete combustion of the carbon remaining in the ash, and at the same time having the effect to lift or float the ash to a certain extent and keep it in motion so that under the influence of gravity it will travel progressively or gradually toward the ash door. An illustrative form of such a floor is shown in Fig. 1 and in detail in Figs. 2, 3 and 4. A system of iron or other high conducting blocks 71 is shown, resting upon the water tubes 63 and preferably shaped to the tubes so as to rapidly conduct to the tubes and circulating water the radiant and other heat received from the combustion space. An extensive inflow of air is not desired and there are shown a system of longitudinal ribs 72 at the edges of the blocks engaging with corresponding grooves 73 at the opposite edges, so that the blocks are held in horizontal alinement, but spaced slightly apart so as to leave slits or gaps 74 through which air can percolate upwardly as described, the rib and groove structure being such as to restrict without totally obstructing the upflow of air. In a longitudinal direction the floor blocks 71 may be spaced from each other by means of small buttons or projections 75 at their ends, thus producing narrow gaps or slits 76 in a crosswise direction. The upward percolation of air is thus distributed thoroughly over the entire area of the floor. In order that the character of the air passage through the slits 76 may correspond with that through the slits 74 the side edges of the blocks are shown formed respectively with overlying and underlying shoulders 77 and 78 which engage in a manner to restrict, but not to totally obstruct the upflow of air.

The air upflowing through the cooled floor does not require to be of atmospheric temperature and may be preheated. A preheating passage 80 is shown in the rear wall 16 of the furnace, controlled by a series of dampers 81 regulating the amount of air passing into the passage, and thereby the rate of air inflow through the percolating floor. An aperture 82 is shown in the rear wall at a point above the floor to admit air at that point if desirable, under control of a damper. The preheating passage however is carried to the base of the furnace and there connects with an entrance or passage 83 to the air box 21 beneath the furnace floor or bottom, thus providing preheated air as stated. The floor is thus cooled both by the air drawn through its crevices or perforations and by the water circulation tubes, and is in that way protected from overheating and from slagging of molten ash. The air has been preheated and will be further preheated in filtering through the floor. This air conduces to quick and thorough combustion of residue carbon as it is of high oxygen content.

Among the various modifications which are possible there are shown certain modifications in the construction of the floor. For example in Fig. 6 the water tubes 63ª are shown as contacting directly against the foundation 85 so as to form narrow air spaces 21ª. The iron floor blocks 71ª are similar to the blocks 71 already described excepting that in Fig. 6 they do not extend as far down, but preferably only to the diameter of the water tubes. With this form there is a decided saving in furnace space, and therefore first cost and the floor is equally effective inasmuch as the underneath passages 21ª are ample to convey the necessary air to all parts of the floor. In Fig. 7 a variation is shown wherein the floor blocks 71ᵇ differ from the blocks 71 in that they entirely surround the water tubes 63ᵇ and may be slipped upon the tubes and shrunk into place, leaving slight gaps or slits 74ᵇ as before. The blocks 71 should have high conducting power and are preferably composed of steel or cast iron. In the case of some of the forms the floor blocks could be made of silicon carbide.

In cases where excessive steam capacity is not desired and therefore floor water tubes are undesirable an effective cooled floor or bottom for the purposes of this invention can be otherwise afforded, in the manner illustrated in Figs. 8 and 9, wherein a system of refractory blocks or bricks are arranged for the purpose, although silicon carbide or other material could sometimes be substituted. Laid directly upon the foundation 85 is shown a system of bricks or blocks 86 extending longitudinally and spaced apart to form air passages 21ᵇ, these underlying bricks serving as supports for a system of transverse bricks 87 which are laid together fairly closely but spaced slightly as indicated in Fig. 9 so as to form a series of transverse air slits 88 and longitudinal air slits 89 by which the air entering through the under passages 21ᵇ can percolate through at all parts of the floor and through the overlying ashes into the combustion chamber. While various means of spacing and securing the bricks or blocks in place may be employed it is found that in many cases it is sufficient simply to introduce a moderate quantity of sand or other loose refractory material 90 which partly fills up the spaces between the transverse bricks 87 above the longitudinal bricks 86, so as to maintain the relation of the floor elements throughout, without interfering with the air percolating action. In this form the floor slits 88 and 89 may be wide and free enough for a substantial sifting of ashes, giving a continuous downward discharge of ashes counter to the air upflow, and the ashes to be removed from below the floor in any desired manner.

It has been stated that the present invention is applicable to various types of furnace and boiler and Figs. 10 and 11 show an embodiment applied to a furnace of the type having a so-called hopper bottom, with opposite inclined sides converging toward a common or central ash pit or discharge. Fig. 10 shows one of the furnace walls 92 and at the bottom the two opposite floor sections 93, each of which embodies steam circulation tubes 94 connected by lower headers 95 and upper headers 96, with an ash pit 97 between and below the two floor sections, and an ash removal gate 98 at the bottom of the pit. In the wall 92, above the furnace bottom, is shown an ash entrance or aperture 100 for reintroducing ash into the combustion chamber. A pipe 101 conveys fly ash by gravity to the aperture 100 and at the point of introduction there is shown a nozzle 102 which may be operated by air, steam, or other flow to draw and inject the ashes into the furnace. It will be understood that in this and other modifications the ashes can be brought to the delivery point in any desired manner such as a screw conveyor. In the embodiment shown in Fig. 10 the ashes are introduced at a point relatively lower than in Fig. 1. To a lesser degree than in Fig. 1 the ashes will take part in the combustion process, the ashes forming a stream or shower 103 which precipitates toward the floor or bottom, passing along the floor by gravity toward the ash pit while subject to final and complete combustion through the exposure to radiant heat in the presence of additional air of combustion introduced through the floor as already described. Fig. 11 shows a convenient form of floor structure for this purpose, the floor composed of separate metallic blocks 104 overlying the tubes 94 and clamped thereto by clamping devices 105 which prevent accidental displacement of blocks in the case of steeply slanted floors. The blocks 104 are shown to be spaced slightly apart forming air percolation slits which permit the air to find its way between the block and the tube due to the naturally rough character of the surface of the cast block; air also being admitted through slits between longitudinally adjacent blocks as in the other embodiments. Below the described floor structure are air passages 106 permitting air to have access to all parts of the water floor.

With the type of furnace shown in Figs. 10 and 11 the fly ash or injected mineral matter may conveniently be introduced through one or more injecting devices in each of the two opposite side walls, so that the material is distributed and sprinkled into the combustion space from opposite directions. In this embodiment or in the embodiment shown in the main figures of the drawings the fly ash or other mineral in suspension may be introduced along with the injected fuel, for example through the burner. An embodiment of this is indicated in Fig. 1 wherein a siphon tube 62 is extended directly into the fuel supply pipe 48, the siphon connected with the ash chamber 43, and the forcibly traveling stream of fuel and air operating by suction to draw the ashes down from the chamber, so that the fuel and air have the ashes mixed with them upon injection into the combustion chamber. In the pipe connecting the ash chamber with the fuel pipe is shown a slide valve 62ª which may be closed or opened more or less to regulate the ash siphoning action. The slide valve is shown closed, whereas the other described ash injecting means are shown in operation. The arrangement can be reversed by mere adjustment, or for that matter the ashes may be introduced simultaneously by both methods.

While the invention is herein shown as employing the fly ash accumulating in the same furnace or boiler, the invention may in some cases be advantageously used for the introduction of fly ash from another source, for example from another furnace; and to the extent that my invention promotes the combustion reactions it may be carried out with any finely divided mineral matter capable of being distributed through the combustion space and raised to radiant incandescence, for example ashes from which the combustible has been completely burned out, or other finely powdered mineral matters.

The injection of the ash or other powdered mineral matters into the combustion chamber will sometimes be useful, and attain part of the advantages of the present invention, in conjunction with furnaces burning oil or gas or other fluent fuel. The invention also may be used with boilers such as the Burroughs boiler, or any other boiler embodying a water screen in the lower part of the furnace. It has already been suggested to deliver fly ash into the pit below the water screen of such a furnace, but according to the present invention the ash should be introduced at a high point, well above the screen, and preferably into or above the combustion zone, to secure certain of the reactions and advantages of the present invention, the water screen preventing slagging at the bottom. In the suggested embodiment the fly ash will preferably be brought by gravity or a conveyor to the arch or top wall of the projecting portion or Dutch oven of the furnace, and dropped into the chamber above or into the entering fuel stream.

The operation of the invention has been indicated. The reactions caused by the injected mineral matter have a beneficial effect upon the combustion, and enable the flameless type of combustion, especially when operating with the so-called short flame carrying a high percentage of ash; although the principles are also applicable to the long or stream line flame. The catalytic action produced by the hot floating non-combustible particles increases with the temperature, and at the same time the action accelerates the combination of oxygen with the combustibles present and so intensifies the calorific power. A type of surface combustion takes place upon each solid particle with the result that the particle itself is put into a state of high incandescence so as to deliver high radiant energy with maximum heating and water-evaporating effect. At the same time the described conditions cause the combustion of the remaining percentage of carbon in the floating ash. Not only therefore are the rate and the completeness of combustion greatly improved, but the total heat generated is caused to be transferred to a greater degree or percentage as radiant energy than heretofore, which is a substantial advantage in improving the efficiency and evaporative power of the boiler and its directly exposed surface. The injected fly ash or other matter, distributed in one way or another over or through the combustion zone, may be partially entrained by the outgoing gases, carrying heat by radiation and convection to the boiler, but preferably the bulk of the fly ash descends in a gradual manner over the cooled bottom, affording a time interval for the burning out of the residual carbon.

The use of these features of the invention in connection with a water floor tends further to improve the advantages described, since the water floor constitutes a direct exposed portion of the boiler; and as already described in a prior application, now Patent 1,703,814, granted February 26, 1929, the use of such a floor allows higher rates of combustion and materially increased rating of boiler performance without running into difficulties from slagging, etc. It will be understood that the floor water tubes may be a part of a superheater, reheater or the like rather than part of the boiler itself.

The use of cooled floor having its surface broken up by perforations, crevices or other openings is of material advantage for combined use with the other features described or for other purposes. Such a floor receives the coarser fuel particles sometimes delivered by a pulverizer, which, with the fly ash, tend to precipitate to the floor, and after reaching the floor are caused to slide, roll or slip along the downward inclination, thus being delayed while continuously subjected to further combustion due to the exposure to radiant heat in the presence of the additional air infiltering or percolating upwardly through the crevices of the floor. If the floor openings are not too large there will be no appreciable downward sifting of ashes, but on the contrary the upflow of air through every aperture has a lifting, tumbling or agitating effect, supporting the fine particles, promoting their combustion, and assisting their gradual travel toward the final discharge. For example, in the case of a floor divided by longitudinal and lateral crevices as illustrated it has been found that a thin layer of soft ash will accumulate on each small section or "island" of the floor, for example six by seven inches in size, each small layer or pile glowing red at its top surface, and the small particles of fuel and ash, in constant motion, progressing from island to island toward the ash door or pit, constantly subject to ideal conditions for consuming the remaining carbon. The floor structure can be varied extensively, and may be built up of perforated blocks through which air ascends to keep cool the blocks and provide for the combustion as described; and in some cases it may be sufficient to inject the additional air obliquely from above to the surface of the floor, as described in a prior application. However, a floor built up of blocks separated by crevices is advantageous in that the loose assemblage of blocks provides allowance for expansion and growth of the metal.

There have thus been described a pulverized fuel furnace and a method of combustion embodying the principles and attaining the advantages of the present invention. Since many matters of construction, arrangement, combination and operation may be variously modified without departing from the principles it is not intended to limit the invention to such matters except so far as set forth in the appended claims.

What is claimed is:

1. The method of firing a furnace comprising continuously introducing into the combustion chamber and burning pulverized fuel in suspension in air, additionally introducing into the chamber substantial quantities of recovered fuel ash, causing the settled residues to rest on the chamber bottom before discharge while exposed to the radiant heat of combustion, and subjecting such settled residues to intimate contact with additional air for combustion while preventing slagging of said residues.

2. The combination of a boiler furnace wherein the combination chamber is contiguous to the boiler, means feeding pulverized fuel to be burned in suspension in air in the chamber; means for feeding recovered ash into the chamber, an inclined water cooled floor exposed to the radiant heat of combustion and receiving the solid matters settled in the chamber, and means for supplying air of combustion to the matters settled upon the floor for completing combustion thereof in the presence of the radiant heat.

3. The combination of a boiler furnace wherein the combustion chamber is contiguous to the boiler, means feeding pulverized fuel to be burned in suspension in air in the chamber; a pocket to collect fly ash from the outgoing products, and means to sprinkle such ash into the chamber atmosphere, a water cooled floor receiving the matters settled in the chamber, and means for supplying air of combustion to the matters settled upon the floor, for completing combustion thereof in the presence of the radiant heat.

4. The method of firing a boiler or similar furnace comprising continuously injecting and burning fuel in pulverized form in suspension in air in the combustion space to which the surface to be heated is exposed, and additionally introducing and causing to be distributed in the same combustion space and contiguous to the suspended burning fuel therein substantial quantities of finely divided and substantially non-combustible mineral matter adapted to incandesce and thereby to accelerate the combustion of the injected pulverized fuel and relatively increase the radiant heat utilization.

5. The method of firing a boiler furnace comprising continuously injecting and burning pulverized coal in suspension in air in the combustion space to which the boiler surface is exposed, and methodically introducing and causing to be distributed in the combustion space and therein mixed with the floating coal therein a systematic supply of finely divided and preponderantly non-combustible mineral matter adapted to incandesce and thereby to accelerate the combustion of the floating pulverized coal therein and to increase the transfer of heat by radiation to the boiler surface.

6. The method of firing a boiler furnace consisting continuously injecting and burning the fuel supply in the form of pulverized fuel in suspension in air in a combustion zone to which the boiler is exposed, and separately injecting and showering into the combustion zone finely divided and relatively non-combustible mineral matter adapted to incandesce while in suspension in the combustion atmosphere contiguous to the boiler.

7. The method of firing a furnace comprising continuously introducing and burning the fuel in the form of pulverized fuel in suspension in air in the combustion space to which the surface to be heated is exposed, and additionally introducing and causing to be distributed in the same combustion space substantially quantities of finely divided fuel ash whereby such ash incandesces while in suspension in the furnace atmosphere, the pulverized fuel being introduced high above the bottom of the combustion space and the ash not lower than the fuel.

8. The method of firing a boiler furnace comprising continuously injecting and burning pulverized fuel in suspension in air in a combustion zone substantially elevated above the furnace bottom and to which the boiler surface is exposed, and collecting fly ash from the outgoing products of combustion and injecting the same in a manner to be distributed in the combustion zone, in mixture with the floating pulverized fuel undergoing combustion, whereby such ash forms an incandescent floating structure accelerating and rendering more complete the combustion of the pulverized fuel.

9. A boiler furnace having a combustion chamber bounded by the boiler surface, and fuel in-feeding means comprising a burner for injecting into the chamber pulverized fuel to be burned in suspension in air, in combination with means for additionally injecting into the chamber in a position to enter the combustion atmosphere quantities of finely divided relatively inert mineral or ash adapted to become incandescent and radiate to such surface and promote combustion of the injected pulverized fuel.

10. A furnace as in claim 9 and wherein is means for relatively regulating the action of the fuel burner and of the inert mineral injecting means.

11. In a boiler furnace of the kind having a combustion chamber bounded above by the boiler and below by a water cooled slag-preventing bottom, a burner for injecting into the chamber pulverized fuel to be burned in suspension in air, and means for additionally introducing into the chamber quantities of fuel ash, to become incandescent in suspension in the combustion atmosphere between the boiler and bottom, whereby to deliver increased radiant heat to the boiler and water cooled bottom while promoting combustion of the injected fuel.

JAY GOULD COUTANT.